Patented Feb. 17, 1925.

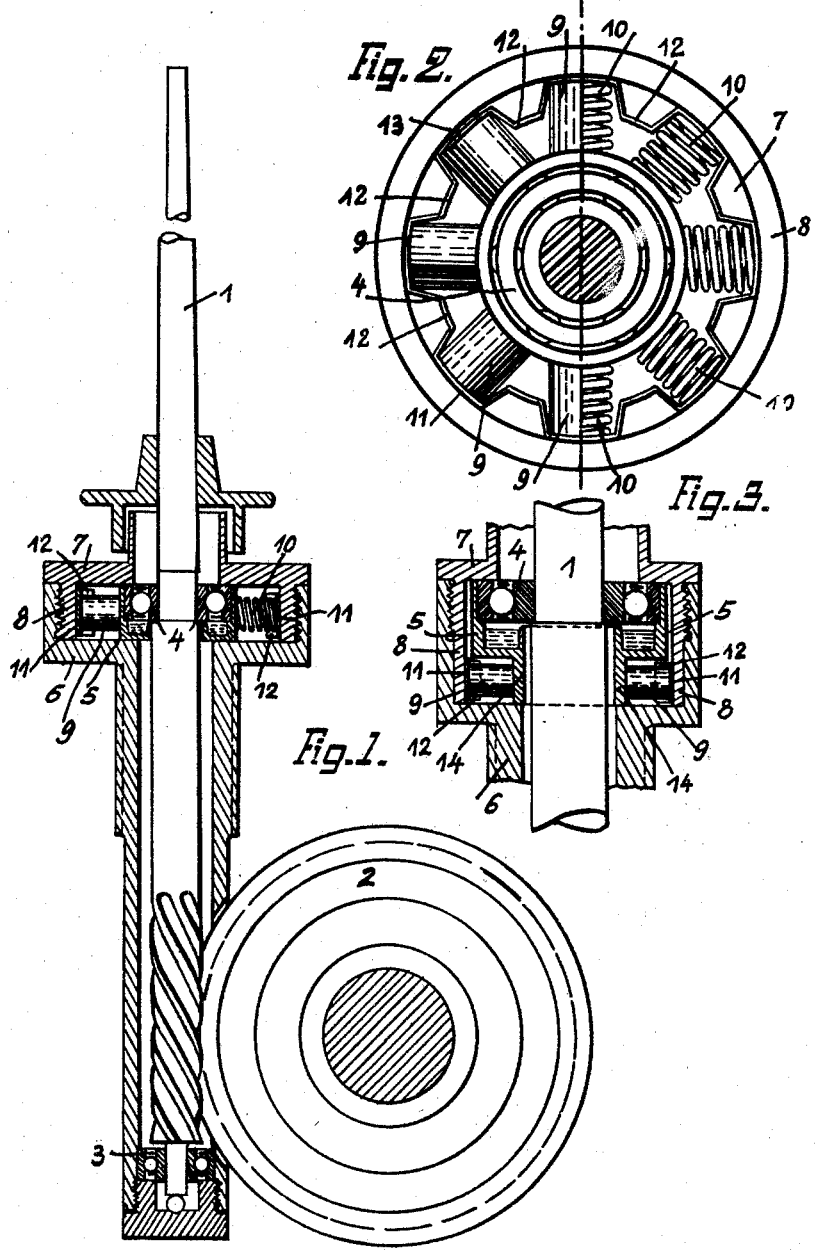

1,526,709

UNITED STATES PATENT OFFICE.

JOHANN JACOB KEYSER, OF AARAU, SWITZERLAND.

SPINDLE BEARING.

Application filed September 14, 1923. Serial No. 662,720.

*To all whom it may concern:*

Be it known that I, JOHANN JACOB KEYSER, a citizen of Switzerland, and a resident of Rain 14, in the city of Aarau, in Switzerland, have invented certain new and useful Spindle Bearings, of which the following is a specification.

This invention has reference to novel means of resiliently journaling the top portion of spindles for spinning and twisting machines and the like, and it is particularly intended to provide a more generally applicable collar bearing of the kind referred to as compared with the previous art, and to generally improve and perfect the construction and to facilitate the operation of devices of this kind. In accordance with the previous art the upper journal bearing of spindles of the kind referred to has been supported by struttingly acting radially mounted springs resting against the casing; but this kind of arrangement has only been employed in connection with spindles operated by belts or the like, and in this case it has merely served for the absorption of the pull of the belt. In the case of positively acting means, however, being employed for the driving of the spindles, such as operation by bevel gear wheels, skew wheels, helical wheels or the like the spring actuating arrangements heretofore in use either operate very unsatisfactorily or refuse to work at all in view of the fact that in the driving of the spindles an increased tendency is imparted to the bearing to participate in the rotation of the spindle shaft, resulting in the jamming of the springs in their guides and the consequent inoperativeness of the device. This very serious drawback is especially noticeable in the operation of large spindles by positive means, such as are required for instance in the case of the twisting of artificial silk.

My invention is intended to overcome these difficulties, and in view thereof the elastic or resilient elements, such as springs or the like for the lateral support of the journal bearing are only retained at their ends, the outer bearing being formed by a steel band embracing the outer extremities of the resilient elements, and permitting easy and perfect insertion of the bearing and of the springs into the socket provided therefor, and without twisting or injuring the springs retained by the steel ribbon, and thereby preventing inoperativeness of the same.

The invention will be more fully described with reference to the accompanying drawing showing by way of example an embodiment of the invention in Figure 1 as a vertical longitudinal section through a spindle operated by positive means. Figure 2 shows on an enlarged scale the mounting of the resilient means in plan view. Figure 3 is a section through the upper bearing for particularly heavy spindles.

The spindle 1 is positively rotated by a wheel 2 or by equivalent means engaging with a worm gear on the spindle. The bottom ball bearing of the spindle at 3 is stationarily mounted. The upper ball bearing 4 for the spindle is mounted in an oil cup 5 which is seated in a guide between the casing 6 and the cover 7. Around the oil cup 5 and between the rim 8 of the cover 7 and the oil cup 5 a plurality of radially arranged elastic or resilient bodies 9 of rubber or helical springs 10 are arranged which act as supporting struts of the bearing 4 and of the oil cup 5 relatively to the cover 7. In order to maintain the elastic bodies 9 or the springs 10 in the proper position with relation to the cover, a steel band 11 is provided which is provided with stamped out projections 12 situated between the several springs 10 or the bodies 9. This steel band is divided at 13 so that the ends will overlap each other. By means thereof the advantage is produced that all springs 10 or bodies 9 may be compressed thereby, so as to introduce them simultaneously into the projecting rim 8 of the cover, and without any liability of twisting or straining of the springs or bodies referred to. The projections 12 are moreover shaped in such a manner as not to interfere at all with the movement of the springs, but providing for the utilization of the complete and uniform spring action of the elements.

In accordance with the modification of Figure 3 the oil cap has an extension, preferably in form of a rim 14 of smaller diameter than the ball bearing, so that in this construction without changing the outer diameter of the bearing casing 6, and with the same sizes of the elastic bodies or springs 10 a ball bearing of considerably greater diameter may be used, such as is required for heavy spindles. This is a point of importance whenever it is necessary to reduce the diameter of the heads of the several spindles, when they are arranged at small distances from each other, so as to be able to mount the spindles in existing or other spinning or twisting machines with closely arranged spindles.

The invention has been shown and described in its broad aspects, and it is obvious that it is capable of modifications and changes within the meaning of the claims hereunto appended and without deviating from the spirit of the invention.

I claim:—

1. In a resilient bearing for positively actuated spindles for spinning and twisting machines and the like the combination with a spindle and substantially radially arranged resilient supporting means around said spindle intermediate its ends, an elastic metal band embracing the outer ends of said resilient means, and distance pieces on said band between the resilient means, and a housing for said band and said resilient means.

2. In a resilient spindle bearing the combination with a spindle and substantially radially arranged lateral resilient supporting means around said spindle intermediate its ends, of a ball bearing substantially adjacent said supporting means, an elastic metal band embracing the outer ends of said resilient means, distance pieces on said band between the resilient means, and a housing for said band and the ball bearing.

3. In a resilient spindle bearing for spinning and twisting machines and the like the combination with a revolving spindle, and substantially radially arranged lateral resilient supporting means around said spindle intermediate its ends, of a ball bearing substantially adjacent said supporting means, an elastic metal band embracing the outer ends of said resilient means, an oil cup for the ball bearing, distance pieces between the resilient means, and a housing for the said band and the ball bearing and the oil cup.

4. In a resilient spindle bearing for spinning and twisting machines and the like the combination with a revolving spindle, and substantially radially arranged lateral resilient supporting means around said spindle intermediate its ends, of an elastic metal band surrounding said resilient means, projections on said metal band disposed between said resilient means, an oil cup spacedly surrounding said spindle and in contact with the ball bearing, and an axial extension on said cup, spaced from said spindle, and in contact with the resilient means, and a housing for the resilient means and the oil cup and the ball bearing.

JOHANN JACOB KEYSER.